3,485,729
ELECTROLYTIC TREATMENT OF WASTE DYE LIQUOR
Gerald Hertz, Pennside, Reading, Pa., assignor to Crompton & Knowles Corporation, Worcester, Mass., a corporation of Massachusetts
Filed June 29, 1967, Ser. No. 650,066
Int. Cl. C01b 7/06; C02c 5/12
U.S. Cl. 204—131                                              5 Claims

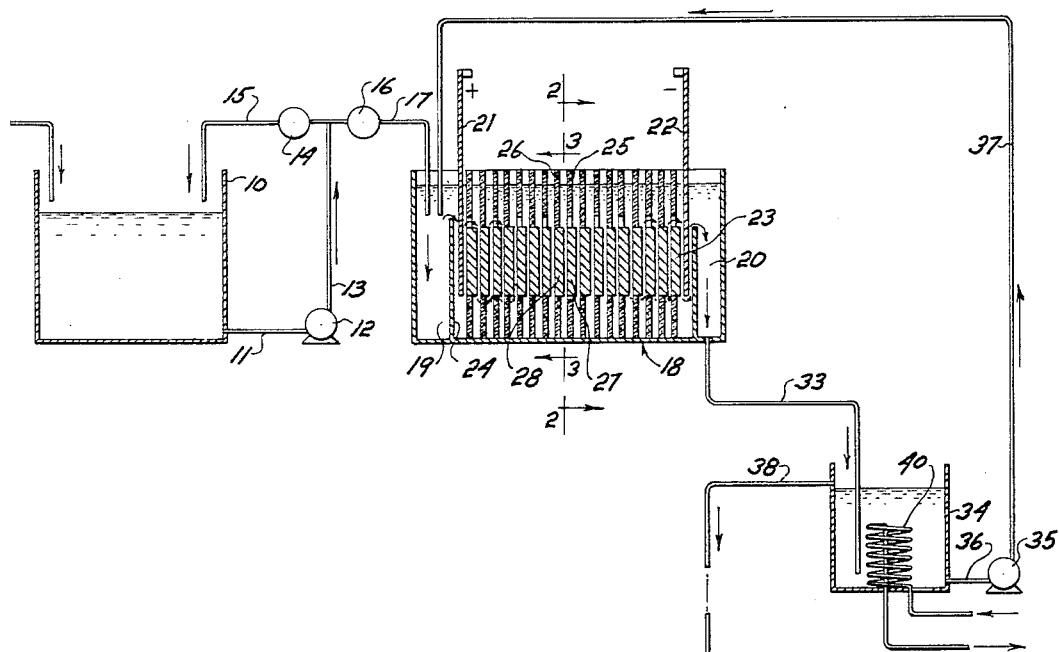
Fig-1
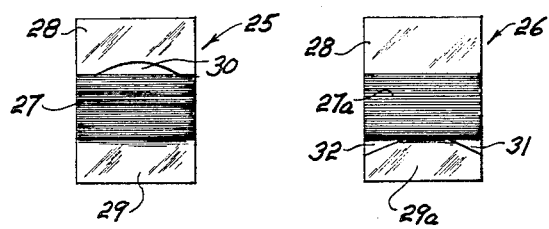
Fig-2  Fig-3
INVENTOR.
Gerald Hertz
BY
Synnestvedt & Lechner
ATTORNEYS United States Patent Office 3,485,729
Patented Dec. 23, 1969

ABSTRACT OF THE DISCLOSURE

Waste dye liquor is decolorized by electrolytic treatment of an aqueous solution containing chloride ions. The organic dyestuff is oxidized by hypochlorite formed thereby permitting the treated material to be discharged into sewers and sewage systems.

---

This invention relates to a method of treating waste liquor from organic dye manufacturing or other waste aqueous liquors containing coloring materials so as to reduce the color intensity of the material to a level that will permit the treated materials to be discharged into sewers and sewage systems without objectionably coloring the systems.

Heretofore, it has been proposed (Czechoslovakian Patent No. 105,798) to subject waste dye liquor from the manufacture of organic dyestuffs to decolorization by first adding inorganic sludges, settling the sludge in sedimentation tanks and thereafter treating the waste water separated in the sedimentation tanks to the action of a direct current whereby organic substances are oxidized at the anode. The aforementioned Czech patent acknowledges that the use of the electrolytic treatment alone leads either to incomplete purification, is exceedingly expensive, or requires complex equipment and cannot be carried out in actual practice because of the violent frothing that occurs.

According to the present invention it has been found possible to efficiently decolorize waste dye liquors and the like where the coloring is caused by an organic material that is oxidizable and decolorized in aqueous solution by means of hydrochlorite provided the waste liquor contains a sufficient concentration of chloride ions to permit the liberation of chlorine and alkali metals. The free alkali metals react immediately with water to liberate hydrogen and form alkali hydroxides. The latter react with chlorine to yield alkali hydochlorites provided the electrolysis is carried out in the type of electrolytic cell in which the chlorine and alkali hydroxides are allowed to mix. Hereinafter, this type of electrolytic cell will be sometimes referred to as "hypochlorite cell." Thus, by the use of such cells in accordance with this invention, satisfactory decolorization of waste dye liquors to permit sewering in public systems can be effected at a power consumption of less than 1 k.w.h./gallon of waste dye liquor treated. The electrolytic process of the invention is such that foaming and the prevention of deposits on the electrodes can be readily controlled.

The method of decolorizing waste dye liquor in accordance with this invention involves:

(1) Filling an electrolytic hydrochlorite cell with aqueous electrically conductive waste dye liquor that contains chloride ions;

(2) Said cell having a liquor inlet compartment adjacent one terminal electrode, a liquor outlet compartment adjacent the opposite terminal electrode and a flow path for channeling the liquor over the terminal and intermediate electrodes in its movement from the inlet compartment to the outlet;

(3) Circulating the dye liquor through the cell by recycling liquor exiting from the outlet compartment to the inlet compartment while subjecting the liquor in the cell to electrolysis adapted to liberate chlorine and form hypochlorite in the dye liquor, and (4) When the color intensity of the dye liquor at the cell outlet compartment has been reduced to an acceptable level for sewering, feeding unelectrolyzed waste dye liquor to the cell inlet compartment at a controlled rate that will not increase the color intensity of the dye liquor at the cell outlet compartment and simultaneously sewering an equivalent amount of the decolorized dye liquor exiting from the outlet compartment.

In the drawings, FIGURE 1 schematically illustrates the process of the invention. FIGURE 2 is a front view of one of the intermediate electrodes of the hydrochlorite cell in FIGURE 1 on section line 2—2. FIGURE 3 is a front view of one of the intermediate electrodes of the hypochlorite cell in FIGURE 1 on section line 3—3.

With reference to FIGURE 1, there is illustrated a waste dye liquor storage tank 10, suction line 11, pump 12, discharge line 13, valve 14 in recirculation line 15 for returning liquid to tank 10; valve 16 in discharge line 17 leading to the hypochlorite cell 18. In the illustrated embodiment, the hypochlorite cell is a rectangular tank with an open top; it has an inlet compartment 19 at one end and an outlet compartment 20 at the opposite end. In the cell proper, between the inlet and outlet compartments, one terminal electrode 21 is positioned adjacent the inlet compartment and the opposite terminal electrode 22 is positioned adjacent the outlet compartment. In some hypochlorite cells, the terminal electrodes also serve as cell dividing walls to form the inlet and outlet zones. Intermediate electrodes 23 are positioned in the tank between the terminal electrodes. Waste dye liquor entering and filling the inlet compartment 19 will follow a flow channel through the cell to the outlet compartment. The flow path is defined by the transverse compartment wall 24 and unaligned openings in the faces of the intermediate electrodes. A conventional arrangement of these openings is illustrated in FIGURES 2 and 3, which represent adjacent intermediate electrodes panels 25 and 26. These panels have a conductive element 27 and 27a (usually graphite) positioned between panels of non-conductive materials 28, 28a, and 29 and 29a such as plastic or glass. In one intermediate electrode 27, there is an opening 30 in the upper non-conductive panel 28 and in the adjacent intermediate electrode 27a there are unaligned openings relative to openings 30, 31 and 32 in the lower non-conductive panel 29a. With this arrangement the cell liquor will follow the channel shown by the arrows in FIGURE 1 in moving from the inlet compartment to the outlet compartment and the products of the electrolysis will be intimately admixed by the convergence and divergence of the cell liquor passing over the faces of the terminal and intermediate electrodes.

The outlet line 33 leads of the outlet compartment 20 to a recirculating tank 34, a pump 35 for recycling dye liquor to the cell is connected to the recirculating tank through suction line 36 and discharge line 37 leading to the cell inlet compartment. Tank 34 is provided with an overflow or spill line 38 near an upper portion that is connected to sewer 39, and adapted to pass excess liquid to the sewer system when the height of the overflow connection is exceeded by liquid in the tank. A heat exchanger 40 for heating or cooling the cell liquor in tank 34 so as to maintain any predetermined or desired temperature therein; preferably the temperature should be held at temperatures below about 120° F. so as to control and minimize chlorate formation. Low operating temperatures also serve to increase the life of the electrodes.

In operation, it should be observed that waste liquor from the manufacture of organic dyestuffs often contain relatively high concentrations of chloride ions due to the use of sodium chloride to salt out the dye. In such cases, it is unnecessary to add chloride ions; however, if the chloride content is very low (e.g., less than about 1 gram NaCl/liter) additional chloride salts should be added— preferably so that there is about 50 to 100 grams NaCl/ liter. While low salt concentrations will conduct electric currents, their low conductance interferes with efficient decolorization.

After the cell 18 has been filled with "salted" liquor and additional liquor has been run into the recirculating tank 34, for example, up to the level of overflow 38, pump 12 is shut down or the discharge bypassed through valve 14 closing valve 16. Pump 35 is operated to circulate liquor through the cell 18. A direct current is then applied to the cell, the voltage drop will vary depending on the cell characteristics and the number of series arranged cells. Good results have been obtained with voltage drops of about 2 to 10 volts per cell and the preferred drop being about 4 to 5 volts per cell. Thus, in a series hypochlorite cell, if the potential applied to the terminal electrodes is 100 volts, the most efficient results are obtained by the use of about 19 to 25 intermediate electrodes.

The cell liquor is recycled through the cell while being subjected to electrolysis. When the color intensity of the dye liquor in compartment 20 (and in tank 34) has been reduced to an acceptable level for sewering, the discharge from pump 12 is allowed to flow through valve 16 and line 17 into the cell inlet 19. However, it is necessary to control the addition of fresh waste liquor so that it will not increase the color intensity of the cell liquor at the outlet; in other words, the fresh waste liquor is added at a rate that will enable it to be decolorized to the desired level in a single pass through the cell. With the addition of fresh waste liquor to the system the level of the liquid in tank 34 will rise until it can overflow through line 38 and maintain a constant volume in the system.

Automatic color sensing means can be placed at various points at or near the cell discharge end. Thus a colorimeter can be located in line 33 and by means of appropriate relays can be arranged to actuate the operation of valves 14 and 16 or pump 12 so that "fresh" waste liquor can be added at a controlled rate needed for continuous cell operation or recycled to the storage tank 10.

Due to the tendency of deposits to form on the electrodes it is desirable to provide automatic means for reversing the polarity of the cell whenever the current flow drops below a predetermined level for a given voltage applied across the terminal electrodes. Upon reversal, the deposits are knocked off the electrodes and the current flow will quickly return to normal.

Electrolysis will inevitably generate gas, and depending on what other ingredients are present and the surface tension of the cell liquor, there will be some foaming. In order to control the foam, a sensing means can be positioned in upper portions of the cell and when that level is exceeded, an anti-foaming agent (such as silicone type anti-foam) can be introduced into the cell liquor at the inlet compartment or the circulating tank or sprayed onto the foam. The addition of the anti-foam will quickly lower the foam level.

One of the gases liberated during the electrolysis is hydrogen, and care must be exercised to exhaust and disperse the hydrogen, and to prevent sparks, arcs or open flames from igniting hydrogen/oxygen mixtures.

EXAMPLE

Tailings and waste dye liquor from the manufacture of various organic dyes were collected in a common storage tank—the composition of the waste varies greatly from day to day and even from hour to hour. The waste, however, was known to contain inter alia, waste liquor from the manufacture of various monoazo, polyazo, pyrazolone, acid anthraquinone, nitro, stilbene and phthalocyanine dyes—some of which were metallized with copper, chromium or cobalt; intermediates and by-products such as the decomposition products of diazonium salts, hydrolysis products, oxidation products and surfactants were also present; the inorganic components were principally sodium chloride, sodium sulfate, sodium carbonate, and sodium bicarbonate and there were traces of $Cr^{+3}$, $Cu^{+2}$, $Fe^{+3}$, $Fe^{+2}$, $Co^{+2}$, $Zn^{+2}$ and sodium sulfide.

The cell was 3' long, 1 foot wide and 2' high. The terminal electrodes were graphite 12" x 24" x ½"; twenty-one intermediate electrodes were employed with ½" electrode spacing. Fifty gallons of waste dye liquor (preheated to about 100° F. and having a pH of 8.6) were circulated in the cell system at a flow rate of 10 g.p.m. A potential of 100 volts (D.C.) was applied across the terminal electrodes and thereby drawing a current of 60–70 amps. The color intensity (determined by spectrophotometric measurements) was reduced over 80% (a level acceptable for sewering in a public system) within 3¼ hours; the power consumption was .34 k.w.h./gallon.

I claim:
1. The method of decolorizing waste dye liquors which comprises
   (1) filling an electrolytic hypochlorite cell with aqueous electrically conductive waste dye liquor that contains chloride ions;
   (2) said cell having a liquor inlet compartment adjacent one terminal electrode, a liquor outlet compartment adjacent the opposite terminal electrode and a flow path for channeling the liquor over the terminal and intermediate electrodes in its movement from the inlet compartment to the outlet;
   (3) circulating the dye liquor through the cell by recycling liquor exiting from the outlet compartment to the inlet compartment while subjecting the liquor in the cell to electrolysis adapted to liberate chlorine and form the hypochlorite in the dye liquor, and,
   (4) when the color intensity of the dye liquor at the outlet compartment has been reduced to an acceptable level for sewering, feeding unelectrolyzed waste dye liquor to the cell inlet compartment at a controlled rate that will not increase the color intensity of the dye liquor at the cell outlet compartment and simultaneously sewering an equivalent amount of the decolorized dye liquor exiting from the outlet compartment.

2. The method according to claim 1 wherein the polarity of the cell is reversed when the current flow drops below a predetermined level for a given voltage applied across the terminal electrodes.

3. The method according to claim 1 wherein an anti-foaming agent is added to the cell liquor when the foam level rises above a predetermined point.

4. The method according to claim 1 wherein a color intensity sensing means measures the color intensity of electrolyzed liquor leaving the cell and actuates and controls the feeding of additional unelectrolyzed dye liquor and the sewering of decloroized dye liquor.

5. The method according to claim 1 wherein the voltage drop is about 2 to 10 volts per cell.

References Cited

UNITED STATES PATENTS

| | | | |
|---|---|---|---|
| 1,630,074 | 5/1927 | Rogers et al. | 204—131 |
| 1,802,640 | 4/1931 | Ewing et al. | 204—78 |

FOREIGN PATENTS 1,135,077   12/1956   France.

HOWARD S. WILLIAMS, Primary Examiner

U.S. Cl. X.R.

204—78